(12) United States Patent
Moon et al.

(10) Patent No.: US 8,605,111 B2
(45) Date of Patent: Dec. 10, 2013

(54) METHOD AND APPARATUS FOR ADJUSTING IMAGE COLORS OF IMAGE PROJECTOR

(75) Inventors: Jae-Won Moon, Bucheon-si (KR); Sung-Dae Cho, Yongin-si (KR); Young-Min Jeong, Suwon-si (KR); Jong-Man Kim, Ansan-si (KR); Yun-Je Oh, Yongin-si (KR); Young-Ho Ha, Daegu (KR); Chul-Hee Lee, Andong-si (KR); Chang-Hwan Son, Daegu (KR); In-Su Jang, Daegu (KR)

(73) Assignees: Samsung Electronics Co., Ltd., Yeongtong-gu, Suwon-si, Gyeonggi-do (KR); Kyungpook National University Industry-Aademic Cooperation Foundation, Buk-gu, Daegu (KR)

( * ) Notice: Subject to any disclaimer, the term of this patent is extended or adjusted under 35 U.S.C. 154(b) by 1403 days.

(21) Appl. No.: 11/904,124

(22) Filed: Sep. 26, 2007

(65) Prior Publication Data

US 2008/0088807 A1    Apr. 17, 2008

(30) Foreign Application Priority Data

Oct. 13, 2006    (KR) .................. 10-2006-0099871

(51) Int. Cl.
*G09G 5/00* (2006.01)
*G09G 5/02* (2006.01)
*G09G 5/06* (2006.01)

(52) U.S. Cl.
CPC ... *G09G 5/02* (2013.01); *G09G 5/06* (2013.01)
USPC ........... 345/600; 345/601; 345/602; 345/603; 345/604; 345/1.2; 353/31; 353/69; 359/649; 348/223.1; 382/167; 382/254; 358/302

(58) Field of Classification Search
CPC .................................. G09G 5/02; G09G 5/06
USPC .................. 345/600, 1.2, 601, 602, 603, 604; 353/31, 69; 359/649; 348/223.1; 382/167, 254; 358/302
See application file for complete search history.

(56) References Cited

U.S. PATENT DOCUMENTS 6,727,942 B1 *   4/2004   Miyano ...................... 348/223.1
6,754,279 B2 *   6/2004   Zhou et al. ............... 375/240.28

(Continued)

FOREIGN PATENT DOCUMENTS

JP    2003-283964    10/2003    ............... H04N 5/74
JP    2004-128575    4/2004     ............... H04N 9/31

(Continued)

*Primary Examiner* — Jin-Cheng Wang
(74) *Attorney, Agent, or Firm* — Cha & Reiter, LLC (57) ABSTRACT

Disclosed is a method for correcting color in a portable image projector in consideration of an effect of a background color when the portable image projector projects images. The method corrects the effect of the background color to be projected, using color constancy technique, and thereby represents high-quality image which can be projected on a white screen. The method includes the steps of determining if a background color exists on a projection screen using a portable camera, converting the size of a mask image in order to connect a spatial position of an original image and an image photographed by a camera, correcting brightness of the mask image in order to correct non-homogeneity of the brightness of the projected image due to the distribution of different brightness values of the background color, and correcting the background color in order to correct color distortion of the image projected in different colors on the background color. The background color correction step includes the sub-steps of initializing chromaticity of the white screen in advance, and correcting chromaticity using a technique of color constancy of human eyesight.

13 Claims, 4 Drawing Sheets

(56) References Cited

U.S. PATENT DOCUMENTS

| | | | |
|---|---|---|---|
| 6,791,606 B1* | 9/2004 | Miyano | 348/223.1 |
| 7,187,343 B2* | 3/2007 | Pate | 345/1.2 |
| 7,286,703 B2* | 10/2007 | Kaku | 382/167 |
| 7,339,596 B2* | 3/2008 | Tajima | 345/600 |
| 2003/0117714 A1* | 6/2003 | Nakamura et al. | 359/649 |
| 2004/0001185 A1* | 1/2004 | Wada | 353/31 |
| 2005/0103976 A1* | 5/2005 | Ioka et al. | 250/208.1 |
| 2005/0162619 A1* | 7/2005 | Hamaya | 353/69 |
| 2006/0066912 A1* | 3/2006 | Kagaya | 358/302 |
| 2006/0078216 A1* | 4/2006 | Kaku | 382/254 |

FOREIGN PATENT DOCUMENTS

| | | | | |
|---|---|---|---|---|
| JP | 2006-109380 | 4/2006 | | H04N 9/31 |
| JP | 2006-174053 | 6/2006 | | H04N 9/31 |
| KR | 2004-107066 | 12/2004 | | H04N 9/73 |

* cited by examiner

METHOD AND APPARATUS FOR ADJUSTING IMAGE COLORS OF IMAGE PROJECTOR

CLAIM OF PRIORITY

This application claims the benefit under 35 U.S.C. §119 (a) of an application entitled "Method and Apparatus For Adjusting Image Colors Of Image Projector" filed in the Korean Intellectual Property Office on Oct. 13, 2006 and assigned Serial No. 2006-99871, the contents of which are hereby incorporated by reference.

BACKGROUND OF THE INVENTION

1. Field of the Invention

The present invention relates to an apparatus and method for adjusting colors of images projected via an image projector, i.e., a portable communication terminal.

2. Description of the Related Art

Generally, an apparatus having a function of projecting images can project the image at different directions designated by a user. The image projecting apparatus typically displays image data, which are stored in a memory, or image signals, which are input through an image input terminal, on a screen. A white wall or a flat surface with a certain color may be used as a screen.

Such an image projector generally has a distinguished characteristic from an internal display unit, such an LCD. In the internal display unit, a necessary setting can be easily performed, and colors of the image may be effectively displayed using set values. However, an external display unit such as an image projector is affected by the environment in which colorful images is projected, for example, brightness of the external light source, color of a screen, etc. The projection condition can affect the quality of projected images, especially in the image projector, such as a portable terminal, when used in a moving environment.

The portable terminal in today is recognized as a multi-entertainer, which provides users with a variety of information on life and culture, for example, Internet shopping, phone banking, photographing, watching broadcast, entertainment, biological diagnosis, etc. as well as a means for communication. In order to realize various contents, such as moving pictures, movies, three-dimensional games, etc., more multimedia devices such as a digital camera, a Digital Multimedia Broadcasting (DMB) system, a MP3 player, etc. are miniaturized and embedded in a portable terminal.

Now, there are efforts to install a function of a general beam projector to the portable terminal while overcoming the limitation of size limit in the portable terminal, so that a user to watch movie or to play a game. However, a hardware-technical problem including a lens of a general image projector, a low luminance according to the miniaturization of a backlight, and a distortion of projected image, and a distortion problem of projected image caused by effect of circumstance and color quality of the portable image projector have been a roadblock to the development of these products.

Unlike a general Liquid Crystal Display (LCD) or a Digital Light Processing (DLP) in which a light source and a screen are fixed, the portable image projector provides images, the quality of which is affected by the background color of an object on which the images are projected, or the surrounding light sources because of frequent movement of the portable terminal. To this end, a color correction technology has been developed, which considers the color of an object on a projection screen when a portable image projector is implemented.

As an example of the conventional color correction technology considering a background color, there is a background color correction technology using a color adaptability of human eyesight for a general projection equipment (for example, Masato Tsukada, "Projector Color Reproduction Adapted to the Colored Wall Projection" CGIV 2004). This method is a technology in which a color adaptable model of human eyesight is introduced into a color space of CIEXYZ in order to correct the background color. However, this method has many errors in the correction of the background color due to an error in eliciting RGB output value and CIEXYZ value of a color sensor. Particularly, it is difficult to realize the color correction technology in the CIEXYZ color space in real-time because of an amount of calculation in gamut mapping and device characterization procedures.

SUMMARY OF THE INVENTION

Accordingly, the present invention has been made to solve the above-mentioned problems occurring in the prior art and provides additional advantages, by providing a color correction method which can determine if a background color exists, through a camera embedded in a portable terminal, and remove an effect of the background color by applying a color constancy technique of human eyesight to non-homogeneity of brightness of projected image and color distortion, caused by different brightness values of the background color and a distribution of color when the background color exists.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PRESENT INVENTION

Hereinafter, exemplary embodiments of the present invention will be described in detail with reference to the accompanying drawings. For the purposes of clarity and simplicity, a detailed description of known functions and configurations incorporated herein will be omitted as it may make the subject matter of the present invention unclear.

Figure 1:
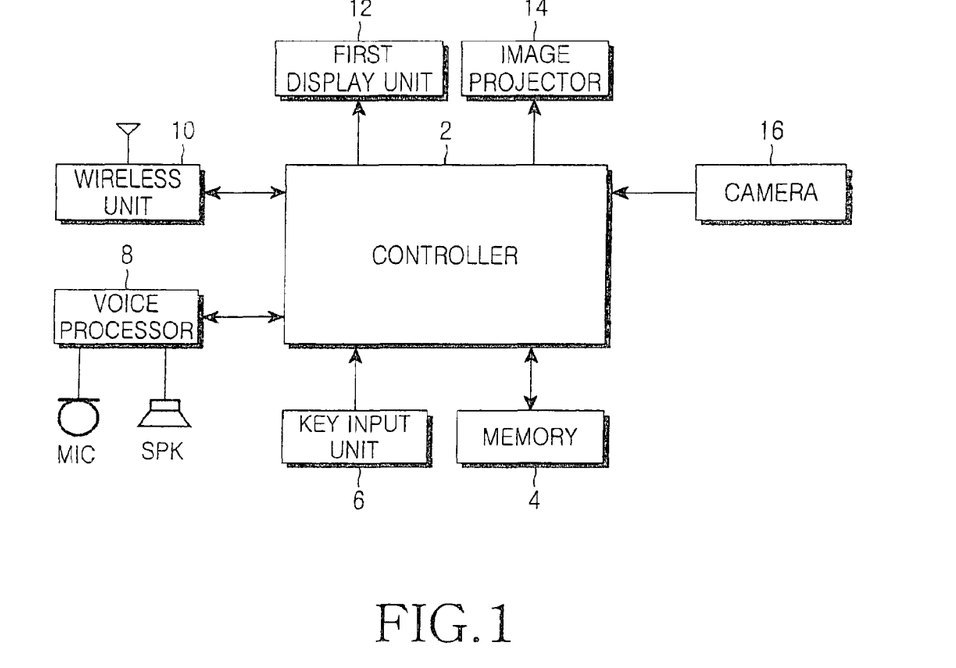
FIG. 1 is a block diagram illustrating the entire configuration of a portable terminal including an image projector according to an embodiment of the present invention.

FIG. 1 is a block diagram illustrating the configuration of a portable communication terminal including an image projector according to the embodiment of the present invention. For illustrative purposes, a portable communication terminal will be described as an example in this specification. However, it should be noted the teachings of the present invention is applicable to that other devices equipped with an image projector Referring to FIG. 1, the portable communication terminal according to the embodiment of the present invention includes a controller 2, a memory unit 4, a key input unit 6, a voice processor 6, a wireless unit 10, a first display unit 12, an image projector 14, and a camera 16.

The key input unit 6 is used to input phone numbers or characters by a user. It includes keys for inputting numeric and characters and function keys for setting various functions. The key input unit 6 outputs the input signals from the keys to the controller 2. The first display unit 12 is an internal display unit of the portable communication terminal which may include a Liquid Crystal Display (LCD) and the like. The first display unit 12 carries out a function of outputting image output signals received from the controller 2.

The wireless unit 10 converts user's voice data and control data into wireless signals and then transmits the wireless signals to a base station (not shown) of a mobile communication network. The wireless unit 10 receives wireless signals from the base station and then converts the wireless signals into voice data and control data. The voice processor 8 decodes the voice data received from the wireless unit 10 and then outputs the voice data as audible sound through a speaker. Further, the voice processor 8 converts users' voice signals received from a microphone into data and then outputs the data to the wireless unit 10.

The camera 16 carries out a function of a general digital camera under control of the controller 2, and converts visible image signal, input from an external object, into a digital image data in a suitable format. The image projector 14 is used for performing a general projector function in the portable communication terminal and may include a light source, a permeable display unit, a lens, etc.

The controller 2 controls the operation of respective units collectively, so as to perform a function of controlling the overall operation of the portable communication terminal. Specifically, the controller 2 performs an operation depending on signals relating to the number and menu selection input through the key input unit 6, and also receives through a camera 16 image signals relating to a photographed object so as to operate an operation depending on the image signals. Furthermore, the controller 2 outputs image input signals, which are required to display images taken with the camera, using the first display 12 or an image projector 14. The controller 2 reads or stores contents to be output from/into the memory 4 during operation. The memory 4 stored programs and data relating to the operation of the controller 2 stored therein, and is also used for storing information on images taken by the camera as well as necessary information in operating the portable communication terminal.

The portable communication terminal operates the general communication services, and conducts an image projecting function relating to the present invention through the image projector 14. Technology relating to a portable communication terminal including such an image projector is disclosed in Korean Patent Application No. 2004-29693, filed on Apr. 28, 2004 by Sung-Goo KIM, entitled with "Portable Terminal having Image Projector and Method For Controlling the Same", the content of which is incorporated by reference herein.

Meanwhile, according to the present invention, the controller 2 additionally performs the operation of adjusting image colors as well as the above-mentioned functions. In addition, the controller 2 stores a program relating to an image projecting operation or relating information to adjust colors in the memory 4, and if necessary, the controller 2 outputs the information.

Now, the operation of adjusting the colors according to the present invention will be described in detail with reference to the accompanying drawings below.

Figure 2:
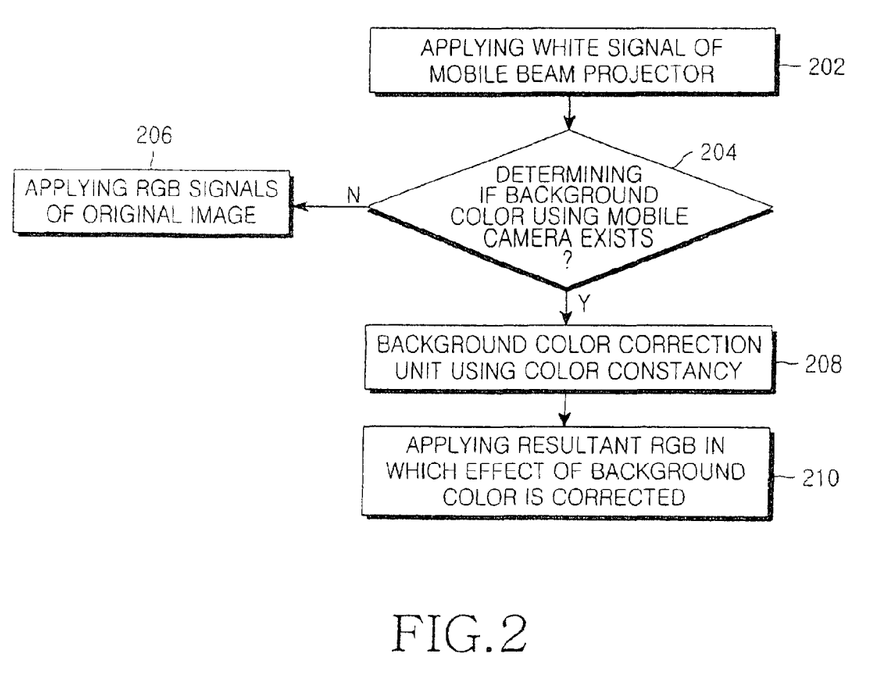
FIG. 2 is a flowchart illustrating the operation of adjusting colors of images in the image projector according to the embodiment of the present invention.

FIG. 2 is a flowchart illustrating the operation of adjusting image colors from the image projector according to the present invention. Referring to FIG. 2, in the operation of adjusting the image colors, first, white signals (255, 255, 255) of RGB is output on a projection screen in order to detect a background color of a projection screen, in step 202. Then, it is determined whether there is another background color in addition to white color by taking a picture of the background color of the projection screen using a camera 16 embedded in the portable terminal and calculating chromaticity of average value of RGB images, in step 204.

If another background color exists, the background color correction unit according to the present invention applies the color correction technology to the projecting image in step 208 and then outputs resultant images, in which RGB is corrected, in real-time in step 210. Meanwhile, if the background color is white, the original images are projected on a portable image projection, or the color correction technology embedded in the portable image projector may be applied selectively to the images in step 206.

Figure 3:
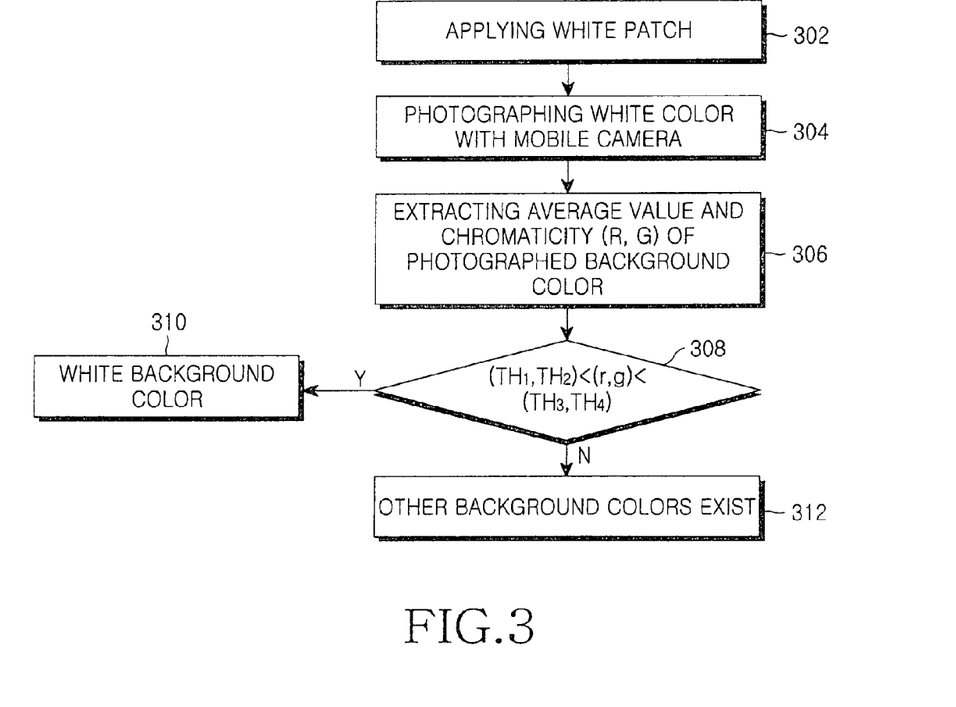
FIG. 3 is a flowchart illustrating the operation of determining if a background image exists in FIG. 1.

FIG. 3 is a flowchart illustrating steps of determining if the background color exists using a camera, as described above. Referring to FIG. 3, first, white color patch including RGB (255, 255, 255) signals is output through the image projector 14 before original images are projected, in step 302. Then, it takes a picture of the background color by means of the camera 16, in step 305. Next, it is determined if the background color exists by calculating an average value of each channel of the pictured images (background color) and obtaining chromaticity value showing a ratio of RGB signals to the sum of RGB color signals instead of absolute magnitude of the RGB signal using the following equation (1), in step 306.

$$r = \frac{R_{ave}}{R_{ave} + G_{ave} + B_{ave}}, g = \frac{G_{ave}}{R_{ave} + G_{ave} + B_{ave}} \quad (1)$$

$$(TH_1, TH_2) < (r, g) < (TH_1, TH_2)$$

In the equation (1), ($R_{ave}$, $G_{ave}$, $B_{ave}$) value means an average value of the background color captured by the camera, and (r, g) represents chromaticity of the background color.

The obtained chromaticity is compared with a specified threshold ($TH_1$, $TH_2$) and ($TH_3$, $TH_4$), in step 308. As a result of comparison, if the chromaticity is in a range of the specified threshold, the background color is regarded as white, in step 310. If the chromaticity is out of a range of the specified threshold, it is determined that the background color exists, in step 312. Then, in the next process, the background color correction unit performs an operation of correcting the background color, as explained hereinafter with reference to FIGS. 4-6.

Figure 4:
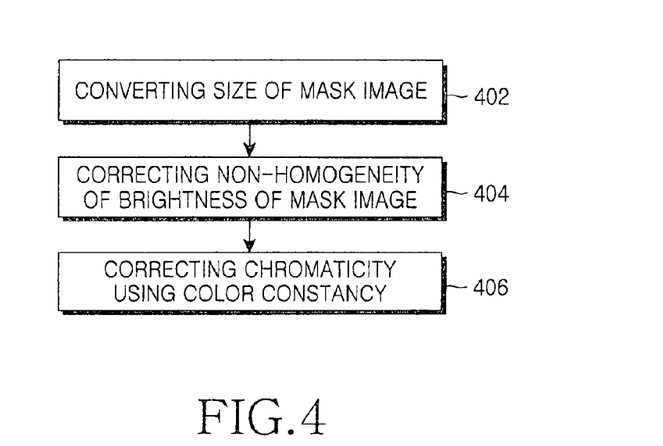
FIG. 4 is a flowchart illustrating the operation of a color correction unit in FIG.

FIG. 4 is a flowchart illustrating the operation of the background color correction unit according to the embodiment of the present invention. Note that the background color correction unit is employed in an image processing module, such as the controller.

Referring to FIG. 4, the color correction unit according to the present invention carries out converting a size of a mask image in step 402, correcting brightness of the mask image nonhomogeneously in step 403, and correcting chromaticity using color homeostasis in step 404.

In FIG. 4, the mask image represents the background image captured by the camera in order to determine if the background color exists in the projection screen. In step 402 of converting the size of the mask image, the size of the image captured by the camera is converted into the size of an original image. The size of the original image display on the portable screen is 240×320. However, the size of images captured by the camera for determination of the background color is variable depending on the performance of the camera and the picturing option. Therefore, converting the size of the pictured image into the size of the original images is necessary in order to obtain the corrected image resulting from the original images, in view of the effect of the background color in step 402.

Converting the size of the mask image can be implemented by calculating the ratio of width to length of the pictured images and the original images in order for down-sampling using the following equation (2) or by using the conventional interpolation methods.

$$n_1 = \frac{W_c}{W_d}, n_2 = \frac{H_c}{H_D} \quad (2)$$

$$MaskImage = MaskImage\left(\frac{x}{n_1}, \frac{y}{n_2}\right)$$

In equation (2), ($W_c$, $H_c$) represents the values of width and length of an image pictured by the portable terminal, and ($W_D$, $H_D$) represents the values of width and length of an original image. $n_1$ and $n_2$ represent the ratio of width to length in the pictured image and the original image. 'MaskImage' represents the pictured mask image, and (x, y) refers to a coordinate of a special position of a pixel. The pictured mask image is down-sampled by the ratio of $n_1$ and $n_2$ in order to convert the size of the image.

Figure 5:
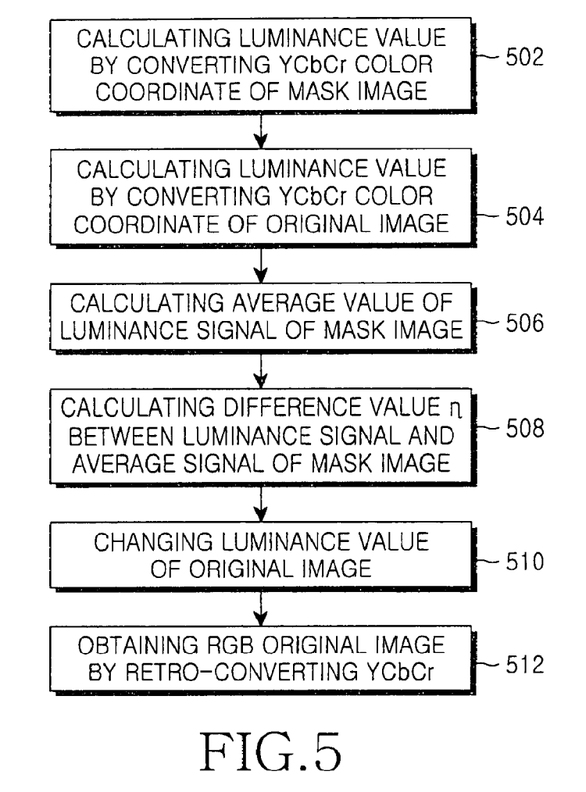
FIG. 5 is a flowchart illustrating steps of nonhomogeneously compensating the brightness of a mask image in FIG. 4.

FIG. 5 is a flowchart illustrating a step of correcting the brightness of the mask image (step 404) in FIG. 4 nonhomogeneously. In a case where the mask image does not have a single background color, specifically various kinds of textures or a background picture are inserted in the background color, distortion, in which the brightness of images projected with different reflective ratios is spatially non-homogeneous depending on the position of the background color, is corrected. Since the background color of the projection screen has different reflective ratios depending on the spatial position, the brightness of the projected image can be uniformly corrected by correcting the brightness of the original image using the brightness of the pictured mask image.

More specifically, referring to FIG. 5, according to the technology of correcting the brightness of the pictured mask image, first, the RGB value of the original image and the mask image is moved to a color spatial coordinate YCbCr in which a luminance signal and a color signal can be separated from the RGB value. Then, an average value $Y_{MaskImage-Ave}$ of the luminance of the mask image is calculated in steps 502, 504 and 506. Then, the difference of the luminance value $Y_{MaskImage}(x, y)$ corresponding to each pixel of the mask image is obtained on the basis of the average value $Y_{MaskImage-Ave}$ of the luminance of the mask image in step 508. If the luminance value is larger than the average value of the luminance of the mask image, the luminance value Y(x, y) of the original image is reduced by the difference between the luminance value and the average value. Otherwise, if the value of the luminance corresponding to each pixel of the mask image is smaller than the average value of the luminance of the mask image, the value of the luminance of the original image increases by the difference between the luminance of the mask image and the average luminance of the mask image, thereby correcting irregularity of the brightness of the background color. The step of correcting the irregularity of the brightness in such a mask image can be expressed by the following equation (3).

$$Y_{MaskImage}(x,y) = 0.299 R_{MaskImage}(x,y) + \\ 0.587 G_{MaskImage}(x,y) + 0.114 B_{MaskImage}(x,y) \\ Y(x,y) = 0.299 R_{OriginalImage}(x,y) + \\ 0.587 G_{OriginalImage}(x,y) + 0.114 B_{OriginalImage}(x,y) \\ Y_{correct}(x,y) = Y(x,y) + (Y_{MaskImage-ave} - \\ Y_{MaskImage}(x,y)) \quad (3)$$

In equation (3), ($R_{MaskImage}$(x, y), $G_{MaskImage}$(x, y), and $B_{MaskImage}$(x, y)) are values obtained by normalizing each pixel value of the mask image to 0-1, and ($R_{OriginalImage}$(x, y), $G_{OriginalImage}$(x, y), and $B_{OriginalImage}$(x, y)) are values obtained by normalizing each pixel value of the original image to 0-1. $Y_{MaskImage}$(x, y) and Y(x, y) are luminance values obtained by converting the values of the mask image and the original image into a color space coordinate of YCbCr.

In the YCbCr color space coordinate, a color signal component still remains kept, nonhomogeneity of the brightness due to different reflexibilities of the background color can be corrected by adding the difference between the luminance signal ($Y_{MaskImage}$(x, y)) of the mask image and the average value of the luminance ($Y_{MaskImage-ave}$) to the luminance value of the original image, in step 510. The corrected luminance value ($Y_{Correct}$(x, y)) of the original image is converted into RGB image through YCbCr inverse transformation, in step 512.

Figure 6:
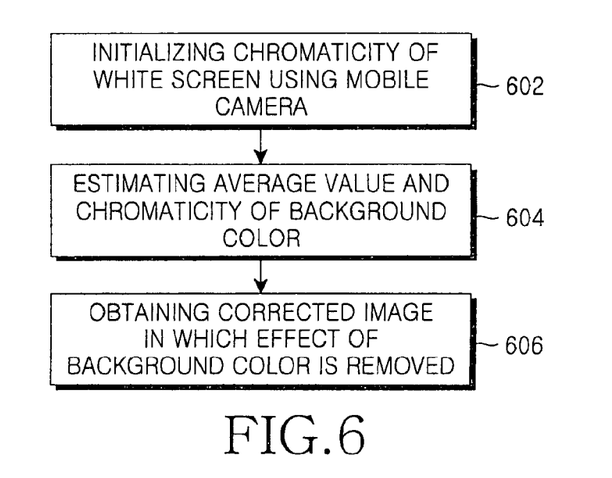
FIG. 6 is a flowchart illustrating steps of compensating chromaticity using constancy of colors in FIG. 4.

FIG. 6 is a flowchart illustrating a step of correcting chromaticity using constancy of color (step 406) in FIG. 4. In such a step, when the original image is projected on the background color having the different colors, the image quality deteriorated by the background color is improved. Unlike the conventional image projector projecting image on the white projection surface of a fixed screen, the portable image projector of the present invention can project the image on the background color having the different colors because of characteristic of the portable terminal. Thus, there is required a color correction technology concerning the background color of the projection screen. A method for correcting the background color using the conventional color accommodation model has an error in characterization of a color sensor and a difficulty in a real-time realization. Accordingly, the present invention proposes a background color correction technology for an image projector to which a color constancy technique of human being is applied.

Human beings recognize natural color of an object by countervailing effect of surrounding light sources based on light energy reflected from the object. The human eyesight performs a specifically mechanical operation which can effectively countervail the change of the light source at an initial time when the human being sees the object. This refers to the color constancy of the eyesight of the human being. In the color constancy technique excluding the effect of the light source in the photographed image, the natural color of the object can be obtained by estimating the chromaticity of the light source. The conventional color constancy technique may be used for correcting the effect of the background color of the portable image projection.

Referring to FIG. 6, in step 602 of initializing the chromaticity of the white screen using a camera, the chromaticity of the object having different white background color can be obtained even when the white balance function of the camera is inactivated. Since the portable image projector can project image on different white background color, it is required to set a criterion chromaticity of the white screen. Hence, after the average value of each channel is calculated by taking a picture of an object having different white background color using a camera embedded in the portable terminal, the chromaticity of the criterion white screen is initialized by using equation (4).

$$r_{white} = \frac{R_{averagewhite}}{R_{averagewhite} + G_{averagewhite} + B_{averagewhite}}, \quad (4)$$

$$g_{white} = \frac{R_{averagewhite}}{R_{averagewhite} + G_{averagewhite} + B_{averagewhite}}$$

In equation (4), ($R_{average\text{-}white}$, $G_{average\text{-}white}$, and $B_{average\text{-}white}$) is the average value of the white background color photographed by the camera, and ($r_{white}$, $g_{white}$) represents the chromaticity of the white screen.

In step 604 of estimating the average value and the chromaticity of the background color of FIG. 6, the chromaticity of the background color to be projected is estimated. After the average value of the background color is calculated by using the camera, the chromaticity of the background color can be calculated by the following equation (5).

$$r_{background} = \frac{R_{averageback}}{R_{averageback} + G_{averageback} + B_{averageback}}, \quad (5)$$

$$g_{background} = \frac{G_{averageback}}{R_{averageback} + G_{averageback} + B_{averageback}}$$

In equation (5), ($R_{average\text{-}back}$, $G_{average\text{-}back}$, $B_{average\text{-}back}$) is the average value of a white background color photographed by a portable camera, and ($r_{background}$, $g_{background}$, $b_{background}$) is the chromaticity of the background color.

In step 606 of obtaining the corrected image in which the effect of the background color is removed in FIG. 6, the corrected image can be obtained by multiplying the original image by the ratio of the chromaticity of the background color and the chromaticity of the white screen, which is estimated in steps. In order to remove the effect of the projection screen having the background color, the pixel value of the original image applied to the portable image projection should be changed. For example, in order to obtain the image shown on the white screen from the image projected on the blue-based background color, gain of B-channel corresponding to the blue color should be reduced. Specifically, the corrected image can be obtained by a following equation (6), in which the effect of the background color is removed by multiplying the entire image by the ratio of the chromaticity of the white screen and the chromaticity of the background color.

$$R' = R \times \frac{r_{white}}{r_{background}}, \quad G' = G \times \frac{g_{white}}{g_{background}}, \quad B' = B \times \frac{b_{white}}{b_{background}} \quad (6)$$

In equation (6), (R, G, B) is the pixel value of the original image, and R', G', and B' are the corrected images to which the color constancy is applied. Therefore, the corrected image is output through the image projection, thereby representing the resultant image on the white screen from which the effect of the background color is removed.

As is apparent from the foregoing, in the method of adjusting the image color of the image projector according to the present invention as described above, there is proposed a technique of determining if the background color exists, in which the range of chromaticity is estimated by using a color correction technology of a portable image projector concerning the background color of a screen after the chromaticity of the background color is extracted by using a portable camera embedded in the portable terminal. Moreover, a color constancy of human eyesight is applied to the color correction of the background color to obtain a resultant image similar to the image displayed on the white screen, thereby achieving the high-quality color representation. Furthermore, since the color correction technology includes simple processes and has an amount of calculation, it can be implemented in real-time. Of course, the color adjustment method of the present invention can be applied to general image projectors as well as portable image projectors.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for adjusting image colors of an image projector, the method comprising the steps of:
    outputting by an image projector of a portable communication terminal a white signal to a projection surface;
    photographing by a camera unit of the portable communication terminal a background color by taking a picture of the projection surface;
    calculating by a controller a chromaticity of an average value of the photographed background color in order to determine if another background color and a first white background color exist;
    performing by the controller a color correction of the photographed background color if another background color exists; and
    outputting by the image projector the corrected image to the projection surface in real-time;
    wherein the projection surface comprises a projection screen including one of a flat surface of a certain color and a white wall, and
    wherein a chromaticity of an object having a second white background color differing from said first white background color is obtained without activation of a white balance function of the camera unit,
    wherein the step of performing the color correction comprises the sub-steps of:
    converting an image size into a size of an original image using the photographed background color image as a mask image; and
    correcting a brightness of the original image using a brightness of the mask image, thereby correcting a non-homogeneity of the brightness of the mask image with the converted size, and
    wherein, in the step of correcting the non-homogeneity of the brightness of the mask image with the converted size, the average value of luminance of the mask image is calculated after RGB value of the original image and the mask image is moved to a YCbCr color space coordinate in order to separate a luminance signal from a color signal, and then a difference between the luminance values corresponding to respective pixels of the mask image is obtained on the basis of the average value of the luminance of the mask image, so as to adjust the luminance value of the original image depending on the difference.

2. The method as claimed in claim 1, wherein the white signal on the projection screen comprises a white patch consisting of RGB=(255, 255, 255) as an output on the projection screen.

3. The method as claimed in claim 1, wherein the step of determining if the first white background color exists comprises the sub-steps of:
   calculating an average value of each channel for the photographed background color and obtaining the chromaticity representing a ratio of RGB signal to the entire sum of RGB color signal by $$r = \frac{R_{ave}}{R_{ave} + G_{ave} + B_{ave}}, g = \frac{G_{ave}}{R_{ave} + G_{ave} + B_{ave}}$$
$$(TH_1, TH_2) < (r, g) < (TH_1, TH_2),$$

wherein ($R_{ave}$, $G_{ave}$, $B_{ave}$) represents the average value of the photographed background color, and (r, g) represents the chromaticity of the photographed background color; and
   comparing the chromaticity with a preset threshold region and determining based on the result of comparison if another background color exists.

4. The method as claimed in claim 1, wherein the step of converting the image size of the mask image calculates a ratio of length and width of the original image to the image of the photographed background color and then performs a down-sampling or interpolation for the photographed image.

5. The method as claimed in claim 4, wherein the operation of converting the image size is performed based on the following equation, $$n_1 = \frac{W_c}{W_d}, n_2 = \frac{H_c}{H_D}$$
$$MaskImage = MaskImage\left(\frac{x}{n_1}, \frac{y}{n_2}\right),$$

wherein ($W_c$, $H_c$) denotes the values of width and length of an image pictured by the portable terminal, and ($W_D$, $H_D$) indicates the values of width and length of an original image, wherein $n_1$ and $n_2$ represent the ratio of width to length in the pictured image and the original image, wherein 'MaskImage' represents the pictured mask image, and (x, y) refers to a coordinate of a special position of a pixel, and wherein the pictured mask image is down-sampled by the ratio of $n_1$ and $n_2$ in order to convert the size of the image.

6. The method as claimed in claim 1, wherein the operation of correcting the non-homogeneity of the brightness of the mask image with the converted size is carried out according to the following equation, $Y_{MaskImage}(x,y)=0.299R_{MaskImage}(x,y)+$
   $0.587G_{MaskImage}(x,y)+0.114B_{MaskImage}(x,y)$
$Y(x,y)=0.299R_{OriginalImage}(x,y)+$
   $0.587G_{OriginalImage}(x,y)+0.114B_{OriginalImage}(x,y)$
$Y_{Correct}(x,y)=Y(x,y)+(Y_{MaskImage-ave}-$
   $Y_{MaskImage}(x,y))$ wherein ($R_{MaskImage}(x, y)$, $G_{MaskImage}(x, y)$, and $B_{MaskImage}(x, y)$) are values obtained by normalizing each pixel value of the mask image to 0-1, and ($R_{OriginalImage}(x, y)$, $G_{OriginalImage}(x, y)$, and $B_{OriginalImage}(x, y)$) are values obtained by normalizing each pixel value of the original image to 0-1, wherein $Y_{MaskImage}(x, y)$ and Y(x, y) are luminance values obtained by converting the values of the mask image and the original image into a color space coordinate of YCbCr, and wherein ($Y_{Correct}(x, y)$) is a corrected luminance value of the original image.

7. The method as claimed in claim 1, wherein the step of correcting colors of output image based on the photographed background color further comprises a sub-step of correcting the chromaticity of the image, in which the non-homogeneity of the brightness is corrected, using color constancy.

8. The method as claimed in claim 7, wherein the step of correcting chromaticity using the color constancy comprises the sub-steps of:
   obtaining a chromaticity of a criterion white screen depending on an average value of each channel by calculating a chromaticity of an object with a white background color of said first white background color in different environments;
   obtaining the chromaticity of the photographed background color by calculating and using the average value of the photographed background color; and
   obtaining corrected image by multiplying the original image by a ratio of the chromaticity of the criterion white screen to the chromaticity of the photographed background color.

9. The method as claimed in claim 8, wherein the chromaticity of the criterion white screen is obtained by the following equation, $$r_{white} = \frac{R_{averagewhite}}{R_{averagewhite} + G_{averagewhite} + B_{averagewhite}},$$
$$g_{white} = \frac{R_{averagewhite}}{R_{averagewhite} + G_{averagewhite} + B_{averagewhite}},$$

in which ($R_{average-white}$, $G_{average-white}$, and $B_{average-white}$) represents the average value of an object with the first white background color in different environments, and ($r_{white}$, $g_{white}$) represents the chromaticity of the criterion white screen,
   wherein the chromaticity of the photographed background color is obtained by the following equation, $$r_{background} = \frac{R_{averageback}}{R_{averageback} + G_{averageback} + B_{averageback}},$$
$$g_{background} = \frac{G_{averageback}}{R_{averageback} + G_{averageback} + B_{averageback}},$$

in which ($R_{average-back}$, $G_{average-back}$, $B_{average-back}$) is the average value of the photographed background color, and ($r_{background}$, $g_{background}$, $b_{background}$) is the chromaticity of the photographed background color, and
   wherein the corrected image is obtained by the following equation, $$R' = R \times \frac{r_{white}}{r_{background}}, G' = G \times \frac{g_{white}}{g_{background}}, B' = B \times \frac{b_{white}}{b_{background}},$$

in which (R, G, B) is the pixel value of the original image, and R', G', and B' are the pixel values of the corrected images.

10. A method for adjusting color of projected images of an image projector, the method comprising the steps of:
- outputting by an image projector of a portable communication terminal white signals to a projection surface;
- photographing a background color by a camera unit of the portable communication terminal by taking a picture of the projection surface;
- calculating by a controller a chromaticity of the average value of the photographed background color, so as to determine if another background color as well as a first white background color exist in the photographed background color;
- correcting colors of the output image depending on the photographed background color when the background color exists as a result of determination; and
- outputting the corrected image to the projection screen in real-time,
- wherein the step of determining if the first white background color exists comprises the sub-steps of: calculating by the controller an average value of each channel of the photographed background color and obtaining a chromaticity representing a ratio of each RGB signal in the sum of RGB color signal; and comparing the obtained chromaticity with a preset threshold region to determine if the first white background color exists as a result of comparison, and wherein the step of correcting color of the output image according to the photographed background color comprising the sub-steps of: converting the size of an image into the size of the original image to be projected by using the photographed background image as the mask image; and correcting the brightness of the original image by using the brightness of the mask image during output, so as to correct non-constancy of the brightness of the mask image with the converted size;
- wherein a chromaticity of an object having a second white background color differing from said first white background color is obtained without activation of a white balance function of the camera unit
- wherein, in the step of correcting non-homogeneity of the brightness of the mask image with the converted size, the average value of luminance of the mask image is calculated after RGB value of the original image and the mask image is moved to a YCbCr color space coordinate in order to separate a luminance signal from a color signal, and then a difference between the luminance values corresponding to respective pixels of the mask image is obtained on the basis of the average value of the luminance of the mask image, so as to adjust the luminance value of the original image depending on the difference.

11. The method as claimed in claim 10, wherein the step of converting the size of the mask image is carried out by calculating a ratio of length and width of the photographed background color and the original image so as to perform down-sampling or interpolation for the photographed image.

12. The method as claimed in claim 10, wherein the step of correcting colors of the output image based on the photographed background color further comprises a sub-step of correcting chromaticity of the image, in which the non-homogeneity of the brightness is corrected, using color constancy.

13. The method as claimed in claim 12, wherein the step of correcting chromaticity using the color constancy comprises the sub-steps of:
- obtaining chromaticity of a criterion white screen depending on an average value of each channel by calculating chromaticity of an object with a white background color of said first white background color in different environments;
- obtaining chromaticity of the photographed background color by calculating and using the average value of the photographed background color; and
- obtaining corrected image by multiplying the original image by a ratio of the chromaticity of the criterion white screen to the chromaticity of the photographed background color.

* * * * *

UNITED STATES PATENT AND TRADEMARK OFFICE
CERTIFICATE OF CORRECTION

| | | |
|---|---|---|
| PATENT NO. | : 8,605,111 B2 | Page 1 of 1 |
| APPLICATION NO. | : 11/904124 | |
| DATED | : December 10, 2013 | |
| INVENTOR(S) | : Jae-Won Moon et al. | |

It is certified that error appears in the above-identified patent and that said Letters Patent is hereby corrected as shown below:

Title Page, Item 73, Line 4 should read as follows:
--...Industry-Academic Cooperation...--

In the Claims:
Column 9, Claim 3, Line 19 should read as follows:
--...$(TH_1, TH_2) < (r, g) < (TH_3, TH_4)$,...--

Signed and Sealed this
First Day of April, 2014

Michelle K. Lee
*Deputy Director of the United States Patent and Trademark Office*